March 18, 1941.  R. E. BARCLAY  2,234,950
PROJECTION SCREEN
Filed Jan. 24, 1938

INVENTOR.
ROBERT E. BARCLAY.
BY Allen & Allen
ATTORNEYS.

Patented Mar. 18, 1941

2,234,950

UNITED STATES PATENT OFFICE 2,234,950

PROJECTION SCREEN

Robert E. Barclay, Chicago, Ill., assignor to The Richardson Company, Lockland, Ohio, a corporation of Ohio Application January 24, 1938, Serial No. 186,615

5 Claims. (Cl. 88—24)

My invention is directed to the provision of a new type of projection screen whether for motion picture work or for the projection of still pictures; and my invention has for its several main objects the provision of a screen which is durable, cleanable, relatively inexpensive and adaptable for the viewing of pictures either as reflected by the screen or by projection through the screen.

These and other objects of my invention which will be set forth hereinafter or will be apparent to one skilled in the art upon reading this specification, I accomplish by that certain construction and arrangement of parts of which I shall now set forth certain exemplary embodiments. Reference may be made to the drawing wherein.

In the production of my projection screens I employ a screen material which is a laminated synthetic resin product. That is to say, I make a laminated product of layers or laminae which have been saturated with an incompletely polymerized synthetic resin varnish, dried, assembled, pressed and cured, as is usual in synthetic resin practice. By "synthetic resin varnish" I mean, of course, a polymerized resin dissolved in a suitable solvent, usually alcohol or water, or a mixture of the two. I have found that a wide variety of synthetic resins will serve my purpose, including but without limitation, the phenol formaldehyde types, the urea types, the vinyl types and others. I prefer to use a resin of the aldehyde-urea type. These resins have been completely stabilized, and are weather and water-proof, and not subject to discoloration or deterioration. Also they make a very excellent clear varnish; and I have found that translucent plaques may be made by saturating a good grade of rag paper or the like with a clear urea resin and pressing and curing. These plaques may be made in any desired thickness for strength. They have a large capacity for the passage of light and yet are whitish in body and give good images by reflected light, especially when treated as hereinafter set forth.

Figure 1:
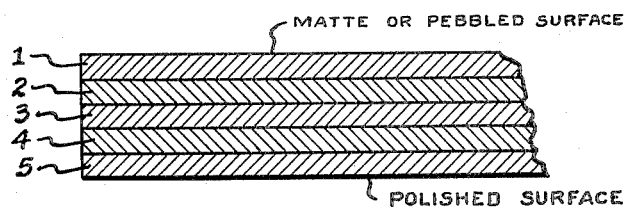
Figure 1 is a view in section of a material from which I make my screens.

In Fig. 1 I have indicated a laminated product consisting of layers 1 to 5 (there may be more or less as desired) of the laminae to which I have just referred. These have been dried and assembled and cured between the plates of a curing press under heat and pressure, so as to carry the polymerization to completion. The under surface of the assembly has been cured against a polished press plate; and if desired, the upper surface may likewise be treated in the manufacture of the article. However, I prefer to give a matte surface to one side of the plaque. Especially where pictures are projected through the screen, if both sides are polished, there is a tendency toward the production of double images, which is quite pronounced with colored pictures. This can be done after manufacture by sanding or otherwise roughening the surface. It can also be done during manufacture by moulding the article against a press plate which has a matte surface. Also where the effects produced by a beaded screen are desired, it is within the purview of my invention to use a press plate so configured as to mould beads into one surface of the plaque or panel.

Where the screen is to be used only for the viewing of projected images by reflected light, the body of the screen may be made opaque by forming one or more of the layers 1 to 5 of an opaque paper or the like, e. g., a paper or other web loaded with titanium oxide. Also for special effects, it is within the purview of my invention to include in the screen one or more tinted or colored layers, whether opaque or transparent.

Figure 2:
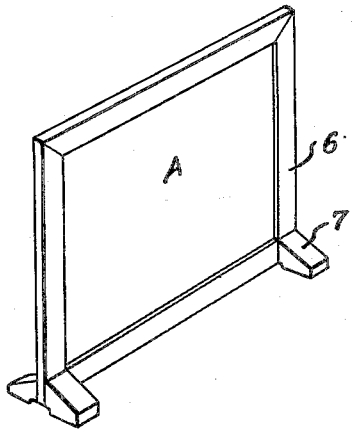
Fig. 2 is a view in perspective of one type of finished screen for amateur or advertising use.

I have discovered that screens manufactured in this way are superior to other screens I have examined for the observation of pictures both by reflected and by transmitted light. The matte, sanded, pebbled or beaded surface of the screen should be toward the observer. Where the pictures are to be viewed by reflected light the projector is, of course, located upon the same side and is focused upon the matte surface. Where the pictures are to be viewed by transmitted light, the projector will be on the opposite side of the screen; but the image will nevertheless be focused through the screen upon the matte or pebbled surface thereof. My screen has sufficient translucency to permit this accuracy of focusing; nevertheless the passage of the rays through the screen from the polished side to the matte side, where they are focused, gives a very pleasant effect having at times the attributes of a three dimensional effect. In viewing pictures by transmitted light a considerable and sometimes effective diffusion may be obtained by viewing the pictures through the polished side as they are focused upon the matte side. In Fig. 2 I have shown one of my screens indicated generally at A in a frame 6, having supporting legs 7. This is exemplary of one form of relatively small screen which I may employ for amateur motion picture or still projection.

Figure 3:
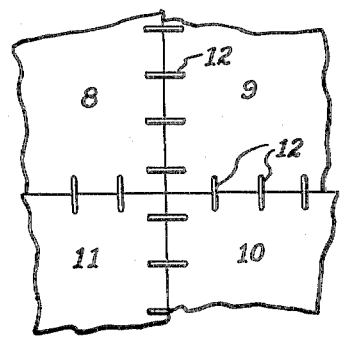
Fig. 3 is a view on a magnified scale of a way of making joints in motion picture screens of the larger type.

My screens may be made in any size depending upon the size of the curing presses available. In the manufacture of screens for use in motion picture theatres and the like, it will frequently be desirable to attach screens together, since it is difficult to secure a cured panel of the size required. Smaller panels may be accurately cut so that their edges may be butted; and they may be fastened together as shown in Fig. 3. Here four panels 8, 9, 10 and 11 are shown in butted relationship and fastened together by staples or the like 12. As a matter of fact, any desired type of fastening may be employed which is essentially as small as or smaller than the smallest detail which will be visible in the projected image at the normal viewing distance. It is possible, of course, to cement a series of cured panels bodily to a supporting structure, but this ordinarily is not required, nor is it desirable, especially where sound is to be reproduced along with the picture images and is to pass through the screen. By fastening panels together as illustrated in Fig. 3, a vibratile screen may be produced which is freely suspendable and permits the passage of sound, while giving a superior reproduction of the photographic images. However, it is also possible to form a framework having bars occurring at the juncture of plaques or panels and to fasten the panels to the framework by means of nails, bolts, rivets, grommets or staples, so long as these are not obstrusive at the normal viewing distance. By reason of the vibratile character of the panels of my invention, sound passes through them readily. But it is also within the purview of my invention to perforate the panels with a greater or less number of perforations which are at least as small as the smallest observable detail at the normal viewing distance.

Screens may also be made in which the panels overlap instead of butting together as described. The overlapping will not be visible when the viewing distance is 25 feet or greater.

Modifications may be made in my invention without departing from the spirit of it.

Having thus described my invention, what I claim as new and desire to secure by Letters Patent is:

1. A motion picture or like screen suitable both for transmitted and reflected images having a self-sustaining panel-like body of laminated resinous construction, said body comprising a plurality of layers of paper saturated in a clear resinous substance and pressed and cured, the said body being translucent, one of the surfaces of said body being of polished character, the other of said surfaces being roughened.

2. A screen as claimed in claim 1 in which the resin is in part at least a resin of the urea type.

3. A motion picture screen of composite character formed of a plurality of the panels of claim 1, said panels being butted edgewise and fastened together in an integral, suspendible, self-sustaining structure by fastening means at the butted edges, which fastening means are substantially as small as the smallest observable detail in a projected image as seen from the normal viewing conditions in which said screen is to be used.

4. A motion picture screen of composite character formed of a plurality of the panels of claim 1, said panels being butted edgewise and fastened together in an integral, suspendible, self-sustaining structure by fastening means at the butted edges, which fastening means are substantially as small as the smallest observable detail in a projected image as seen from the normal viewing conditions in which said screen is to be used, said fastening means being minute staples serving to fasten the said panels together without additional support intermediate the edges of the composite structure.

5. A motion picture screen of composite character formed of a plurality of the panels of claim 1, said panels being butted edgewise and fastened together in an integral, suspendible, self-sustaining structure by fastening means at the butted edges, which fastening means are substantially as small as the smallest observable detail in a projected image as seen from the normal viewing conditions in which said screen is to be used, said fastening means being minute staples serving to fasten the said panels together without additional support intermediate the edges of the composite structure, said panels being perforated at intervals by perforations which are substantially as small as the smallest observable detail at the normal viewing distance.

ROBERT E. BARCLAY.